(12) United States Patent
Nies et al.

(10) Patent No.: US 12,184,047 B2
(45) Date of Patent: Dec. 31, 2024

(54) EASY PULL ELECTRICAL CONDUIT

(71) Applicant: Penn Aluminum International LLC, Murphysboro, IL (US)

(72) Inventors: Jerry W. Nies, Suwanee, GA (US); Barton C. Potter, Carbondale, IL (US); Manikantha R. Daggula, Carbondale, IL (US); Kenneth R. Bolding, Murphysboro, IL (US)

(73) Assignee: Penn Aluminum International LLC, Murphysboro, IL (US)

( * ) Notice: Subject to any disclaimer, the term of this patent is extended or adjusted under 35 U.S.C. 154(b) by 610 days.

(21) Appl. No.: 17/474,439

(22) Filed: Sep. 14, 2021

(65) Prior Publication Data

US 2022/0085582 A1    Mar. 17, 2022

Related U.S. Application Data

(60) Provisional application No. 63/079,289, filed on Sep. 16, 2020.

(51) Int. Cl.
  *F16L 9/14*  (2006.01)
  *H02G 1/08*  (2006.01)
  *H02G 3/04*  (2006.01)

(52) U.S. Cl.
  CPC .............. *H02G 1/08* (2013.01); *F16L 9/14* (2013.01); *H02G 3/0462* (2013.01)

(58) Field of Classification Search
  CPC ... F16L 58/08; F16L 58/1072; F16L 58/1045; F16L 58/108; C08K 3/34; H02G 1/08; H02G 9/06

USPC ...... 138/145, 146, 140, 141, 137; 405/183.5
See application file for complete search history.

(56) References Cited

U.S. PATENT DOCUMENTS

| | | | | |
|---|---|---|---|---|
| 4,892,442 | A * | 1/1990 | Shoffner | H02G 1/08 264/171.27 |
| 4,987,105 | A * | 1/1991 | Wright | C04B 35/6455 501/99 |
| 5,027,864 | A * | 7/1991 | Conti | G02B 6/50 385/136 |
| 5,238,328 | A * | 8/1993 | Adams | H02G 9/06 405/15 |
| 2003/0102043 | A1* | 6/2003 | Field | G02B 6/4459 138/108 |
| 2008/0015122 | A1* | 1/2008 | Student | C10M 169/00 508/155 |
| 2008/0015123 | A1* | 1/2008 | Student | C10M 169/00 508/155 |
| 2014/0373965 | A1* | 12/2014 | Leist | F16L 58/04 138/145 |
| 2021/0363067 | A1* | 11/2021 | Torosyan | C04B 35/583 |

* cited by examiner

*Primary Examiner* — Patrick F Brinson
(74) *Attorney, Agent, or Firm* — Andrus Intellectual Property Law, LLP

(57) ABSTRACT

An easy pull conduit for receipt of wire and/or wire bundles reduces the resistance to pulling wire and/or wire bundles. The conduit has an inner surface and a boron nitride coating applied to the inner surface. An aluminum EMT conduit having the boron nitride coating exhibits a 55 percent reduction in pull force compared to a bare aluminum conduit. A method for reducing the pull force required to pull wire and/or wire bundles through a conduit is also disclosed.

13 Claims, 1 Drawing Sheet

EASY PULL ELECTRICAL CONDUIT

CROSS-REFERENCE TO RELATED APPLICATION DATA

This application claims the benefit of and priority to Provisional U.S. Patent Application Ser. No. 63/079,289, filed Sep. 16, 2020, titled, EASY PULL ELECTRICAL CONDUIT, the disclosure of which is incorporated herein in its entirety.

BACKGROUND

The present disclosure relates to electrical conduit, and more particularly, to electrical conduit through which cable is readily pulled.

Many building codes and construction standards require that electrical cable and wire is installed in electrical raceways, such as electrical conduit. To effect this installation, the conduit is installed in place and the cable or wire (collectively wire) is pulled through the conduit.

Conduit is categorized, generally, as rigid metal conduit which is a thicker wall tubing, electrical metal tubing (EMT) which is rigid, but is a thinner wall tube, and intermediate metal conduit (IMC) which, as the name implies falls between the rigid conduit and the EMT. Other conduit materials include polyvinyl chloride (PVC), fiberglass, and the like.

Depending upon the type of conduit and the conduit material, pulling the wire can be difficult. For example, wire pulling through aluminum conduit is more difficult than pulling through steel or galvanized steel conduit. However steel and galvanized steel are significantly heavier than aluminum. Moreover, rigid conduit (which has a thicker wall) is heavier than EMT (which has a thinner wall). As such there is a tension between the material and type of conduit and the force required to pull wire through the conduit. In many instances, the material and type of conduit required are dictated by code.

In any instance and with any material, wire bundle pull force is a major concern. In order to ease the pulling of wire, a lubricant is used to reduce the resistance to pull.

Accordingly, there is a need for electrical conduit that allows for easily pulling wire and wire bundles through the conduit. More desirably, such an "easy pull" conduit adds little to no weight compared to conduit of similar material and type. More desirably still, such a conduit reduces or eliminates the need for pull lubricants. Still more desirably, such a conduit can be used in existing raceway systems with no other changes to such systems, for example, to previously installed systems.

SUMMARY

In one aspect of the present disclosure, a conduit for receipt of wire and/or wire bundles, has reduced resistance to pulling wire and/or wire bundles, and includes a conduit having an inner surface and a boron nitride coating applied to the inner surface.

In an embodiment, the conduit is an aluminum conduit. The conduit can be an EMT aluminum conduit. The conduit exhibits about a 55 percent reduction in pull force compared to a bare aluminum conduit.

In an embodiment, the conduit is rigid metal conduit. The conduit can be an intermediate metal conduit (IMC). The conduit can be a steel conduit, a polyvinyl chloride (PVC) conduit or a fiberglass conduit.

In an embodiment, the boron nitride is applied in a carrier. The boron nitride can be present in a concentrated solution in a liquid carrier. One suitable liquid carrier is water. In embodiments, the boron nitride is present in a concentration of about 85 percent in the liquid carrier. The boron nitride can also be applied as a powder.

A method for reducing the pull force required to pull wire and/or wire bundles through a conduit, includes providing a conduit having applied to an inner surface thereof boron nitride and pulling a wire or wire bundle through the conduit.

The method can include applying the boron nitride by brushing, spraying, dipping or powder coating. The boron nitride can be applied in a carrier, and can be present as a concentrated solution of an applied coating. In methods, the carrier is water. In embodiments, the boron nitride is present in a concentration of about 85 percent in the liquid carrier. The boron nitride can also be applied as a powder.

Further understanding of the present disclosure can be obtained by reference to the following detailed description in conjunction with the associated drawings, which are described briefly below.

DESCRIPTION OF THE DRAWINGS

Various embodiments of an electrical conduit through which cable is readily pulled are disclosed as examples and are not limited by the figures of the accompanying drawings, in which like references may indicate similar elements and in which.

DETAILED DESCRIPTION

Figure 1:
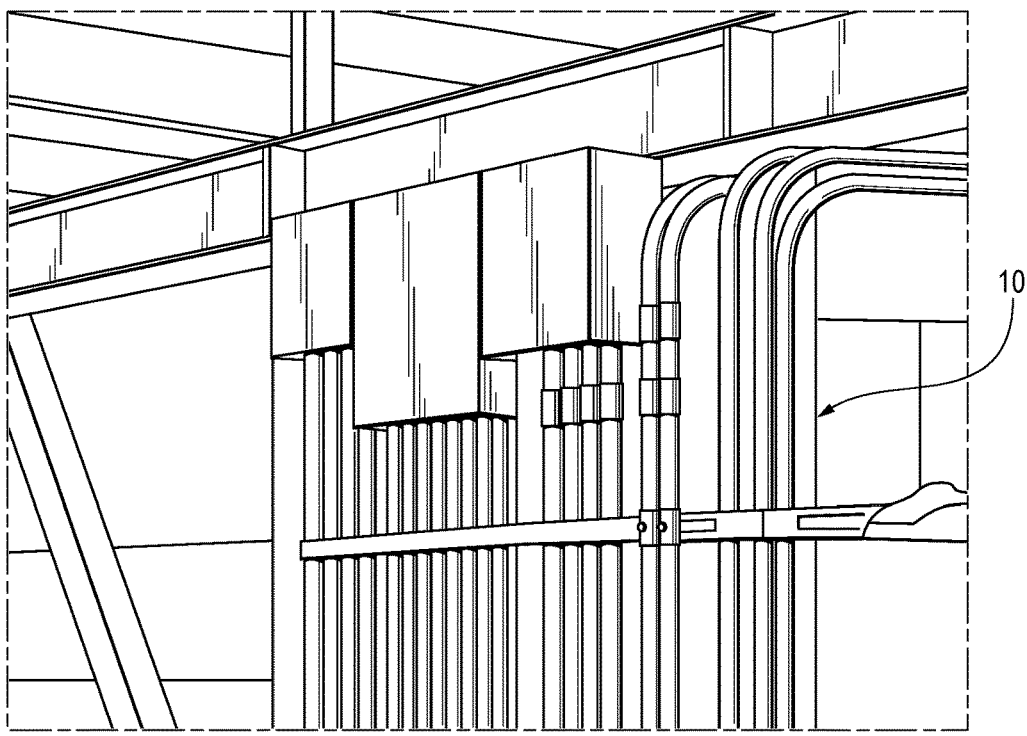
FIG. 1 is a perspective view of a run of several electrical conduit.

While the present disclosure is susceptible of embodiments in various forms, there is shown in the drawings and will hereinafter be described a presently preferred embodiment with the understanding that the present disclosure is to be considered an exemplification and is not intended to limit the disclosure to the specific embodiment illustrated.

A novel electrical conduit has a greatly reduced pulling force required to pull wire and wire bundles (collectively wire) through the conduit. The installation of electrical cable and wire in electrical raceways such as electrical conduit is often required by building codes and construction standards. The wire and/or wire bundles are pulled through the conduit after the conduit is installed in place.

FIG. 1 illustrates a run 10 of several steel electrical conduits. Wire pulling is more difficult in some materials than others. For example, it is easier pulling wire through steel and galvanized conduit than it is pulling through aluminum conduit. Nevertheless, wire bundle pull force is a major concern, and reducing the force needed for wire pull reduces the time and labor required for wire installation. As such, lubricants are often applied to wire or wire bundles at a job site to reduce the resistance to pulling wire and wire bundles.

Figure 2:
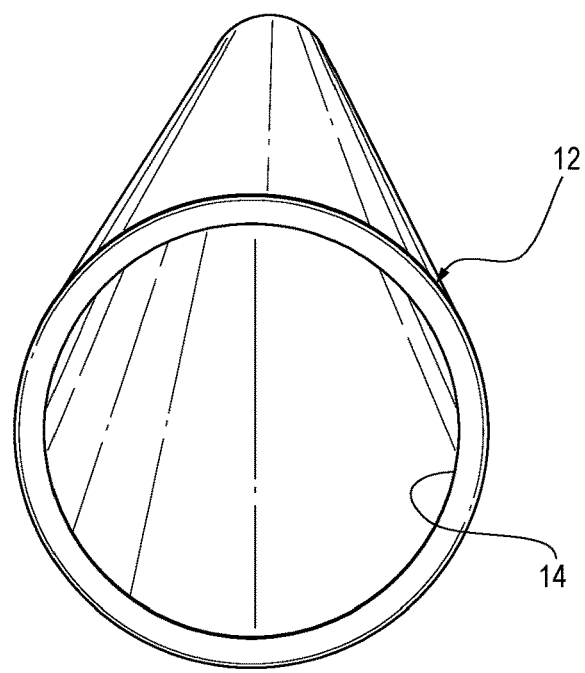
FIG. 2 is perspective view of an easy pull electrical conduit.

In an embodiment, as illustrated in FIG. 2, an electrical conduit 12 has boron nitride applied as a coating 14 to an inner surface of the conduit. The conduit 12 can be rigid metal conduit which is a thicker wall tubing, electrical metal tubing (EMT) which is rigid, but is a thinner wall tube, or intermediate metal conduit (IMC) which, as the name implies falls between the rigid conduit and the EMT. The conduit material can be aluminum, steel, galvanized and the like. Other conduit materials include polyvinyl chloride (PVC), fiberglass, and other suitable materials.

The boron nitride can be provided in a concentrated form in a liquid carrier. In an embodiment, the boron nitride can be at a concentration of about 85 percent, and may be at a higher concentration than 85 percent. One suitable carrier is water. The boron nitride can be applied similar to paint application. It can be applied by brush, sprayed, dipped, and the like. It is also anticipated that the BN can be applied as a powder using known powder coating methods.

As noted above, wire bundle pull force is a major concern in electrical wiring installation. This is especially true for aluminum conduit and EMT.

Samples of conduit with and without BN were tested to determine the decrease in wire pull in pounds force of the BN coated samples.

Three samples were tested. In each, wire as pulled through a ¾" EMT conduit in a lengthy conduit run that included four (4) 90 degree bends. The tested conduit included: (1) steel conduit; (2) bare aluminum; and (3) aluminum conduit with a boron nitride coating. The pull force required for each was as follows:

| Material | Pull force (pounds force) |
| --- | --- |
| Steel conduit | 80.36 lbf |
| Bare aluminum | 130 lbf |
| Aluminum with BN | 59.3 lbf |

From the results above, it can be seen that the use of boron nitride significantly reduces the pull force required for pulling wire. The BN coated aluminum conduit exhibited about a 55 percent reduction in pull force required to pull wire. The steel conduit, which exhibited a pull force of about 62 percent of the bare aluminum, exhibited a pull force about a 35 percent greater pull force than the BN coated aluminum conduit.

A method for reducing the pull force required to pull wire and/or wire bundles through a conduit, includes providing a conduit having applied to an inner surface thereof boron nitride and pulling a wire or wire bundle through the conduit.

The method can include applying the boron nitride by brushing, spraying, dipping or powder coating. The boron nitride can be applied in a carrier, and can be present in a concentrated form of an applied coating. The concentration can be about 85 percent, and may be at a higher concentration than 85 percent. One suitable carrier is water. The boron nitride can be applied similar to paint application. It can be applied by brush, sprayed, dipped, and the like. It is also anticipated that the BN can be applied as a powder using known powder coating methods.

It will be appreciated from the pull force testing results that the use of BN significantly reduces the pull force required for wire pull through conduit. It is anticipated that reduced pull force will be required for all types of conduit, and may eliminate the need for lubricants to reduce the resistance to pulling wire and wire bundles.

It will also be appreciated that the boron nitride coating is a non-flammable, non-hazardous, non-reactive material, which makes it ideal for use in the electrical conduit as disclosed herein. One benefit when used with aluminum conduit is that the entire system (e.g., the conduit and BN coating) are sustainable and recyclable thus providing an ecological benefit and a sustainable marketplace product.

In the present disclosure, the words "a" or "an" are to be taken to include both the singular and the plural. Conversely, any reference to plural items shall, where appropriate, include the singular. All patents and published applications referred to herein are incorporated by reference in their entirety, whether or not specifically done so within the text of this disclosure.

It will also be appreciated by those skilled in the art that any relative directional terms such as sides, upper, lower, top, bottom, rearward, inboard, forward, outboard and the like may be for explanatory purposes only and may not be intended to limit the scope of the disclosure.

From the foregoing it will be observed that numerous modifications and variations can be made without departing from the true spirit and scope of the novel concepts of the present disclosure. It is to be understood that no limitation with respect to the specific embodiments illustrated is intended or should be inferred.

The invention claimed is:

1. A conduit for receipt of wire and/or wire bundles, the conduit having reduced resistance to pulling wire and/or wire bundles, comprising:
   a conduit having an inner surface; and
   a boron nitride coating applied in a carrier to the inner surface, wherein the boron nitride is present in a concentration of at least 85% by weight in the carrier.

2. The conduit of claim 1, wherein the conduit is an aluminum conduit.

3. The conduit of claim 2, wherein the aluminum conduit is an electrical metal tubing (EMT).

4. The conduit of claim 3, wherein the conduit exhibits a 55 percent reduction in pull force compared to a bare aluminum conduit.

5. The conduit of claim 1, wherein the conduit is rigid metal conduit.

6. The conduit of claim 1, wherein the conduit is an intermediate metal conduit (IMC).

7. The conduit of claim 1, wherein the conduit is a steel conduit.

8. The conduit of claim 1, wherein the conduit is polyvinyl chloride (PVC) or fiberglass.

9. The conduit of claim 1, wherein the carrier is a liquid carrier.

10. The conduit of claim 9, wherein the carrier is water.

11. A method for reducing the pull force required to pull wire and/or wire bundles through a conduit, comprising:
   providing a conduit having applied to an inner surface thereof boron nitride, wherein the boron nitride is applied in a carrier and wherein the boron nitride is present in a concentration of at least 85% by weight in the carrier; and
   pulling a wire or wire bundle through the conduit.

12. The method of claim 11, wherein the boron nitride is applied by brushing, spraying, dipping or powder coating.

13. The method of claim 11, wherein the carrier is water.

* * * * *